United States Patent
Maiya et al.

(10) Patent No.: US 7,230,918 B1
(45) Date of Patent: Jun. 12, 2007

(54) SYSTEM FOR USING SPECIAL LINKS IN MULTI-LINK BUNDLES

(75) Inventors: Jagadeesh Maiya, Karnataka (IN); Robert F. Verkroost, Cupertino, CA (US); Ashit Tandon, Sunnyvale, CA (US); John D. Bray, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 958 days.

(21) Appl. No.: 10/246,900

(22) Filed: Sep. 18, 2002

(51) Int. Cl.
*H04L 12/56* (2006.01)
*H04L 12/28* (2006.01)

(52) U.S. Cl. .................... 370/229; 370/395.1

(58) Field of Classification Search ........ 370/229, 370/230, 395.1, 395.2, 395.42
See application file for complete search history.

(56) References Cited

U.S. PATENT DOCUMENTS

| | | | | |
|---|---|---|---|---|
| 5,278,828 | A * | 1/1994 | Chao | 370/394 |
| 6,072,799 | A * | 6/2000 | Cheung et al. | 370/236.1 |
| 6,304,549 | B1 * | 10/2001 | Srinivasan et al. | 370/230 |
| 6,577,596 | B1 * | 6/2003 | Olsson et al. | 370/230 |
| 6,804,194 | B1 * | 10/2004 | Kadambi et al. | 370/229 |
| 2001/0007560 | A1 * | 7/2001 | Masuda et al. | 370/401 |
| 2003/0072261 | A1 * | 4/2003 | Shinagawa | 370/229 |
| 2003/0120799 | A1 * | 6/2003 | Lahav et al. | 709/236 |

OTHER PUBLICATIONS

C. Bormann, "RFC 2686—The Multi-Class Extension to Multi-Link PPP", Sep. 1999. □□From website <http://www.faqs.org/rfcs/rfc2686.html>.*
Cisco System Inc. "Configureing ATM", Copyright 1989-1997. □□From website <http://www.cisco.com/univercd/cc/td/doc/product/software/ios100/rpcg/36030.htm>□□Published month not available.*

* cited by examiner

*Primary Examiner*—Chau Nguyen
*Assistant Examiner*—U-Lun Wang
(74) *Attorney, Agent, or Firm*—Marger Johnson & McCollom P.

(57) ABSTRACT

Selected categories of data are assigned to priority links in a multilink bundle. In one example, virtual circuits in an Asynchronous Transfer Mode (ATM) or Frame Relay (FR) network are assigned priority status and particular types of high priority data are assigned only to the priority virtual circuits.

29 Claims, 8 Drawing Sheets

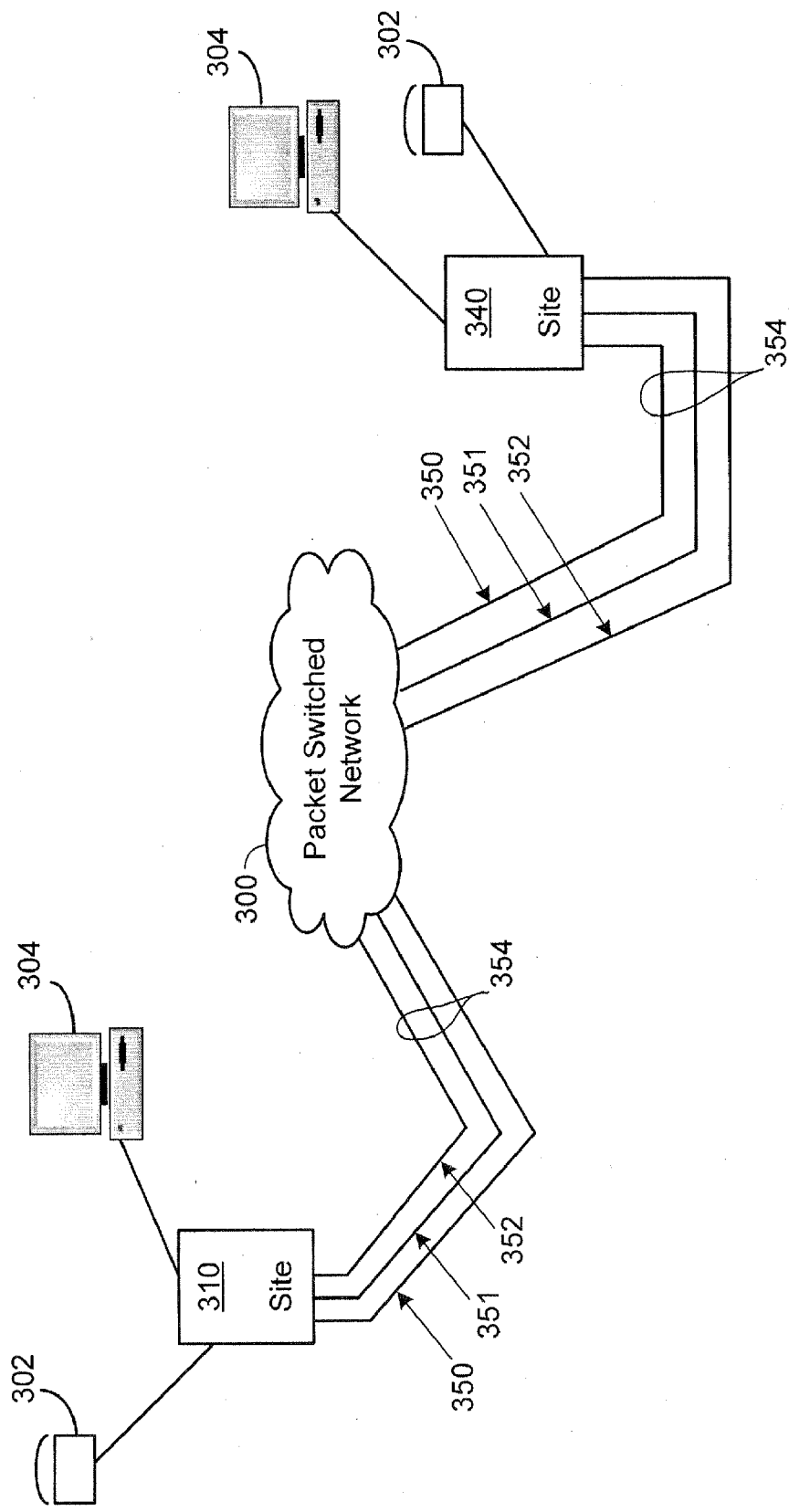
FIGURE 1 (BACKGROUND)

(BACKGROUND)

SYSTEM FOR USING SPECIAL LINKS IN MULTI-LINK BUNDLES

BACKGROUND OF THE INVENTION

A Point-To-Point Multilink Protocol (MP) is described in standards such as ISO7776 (1988) and Draft Standard RFC1990 (1996). The MP scheme obtains higher transmission bandwidths by establishing multiple separate Point-To-Point Protocol (PPP) links. Once a bundle is established, Internet Protocol (IP) packets are distributed among the different links in the multilink bundle. The data is then reassembled from the different links at a bundle termination point.

Draft Standard RFC1990 is a variation on the basic multilink scheme where large messages are fragmented into multiple packets. The fragmented packets are transmitted through the different links in the bundle. Packets for other smaller messages are then interleaved between the fragmented packets of the larger message. The fragmented packets are then recombined in the correct sequence at the bundle termination point.

Multiclass Multilink (MCMP) is described in Request For Comment 2686 and adds the ability to have multiple sequence number streams, so that packets interleaved with the fragmented packets, such as voice packets, can be given sequence numbers.

The process of fragmenting messages into packets, transmitting the packets over the different links in the multilink bundle, interleaving the fragmented packets with packets from other messages, and reassembling the packets in the correct order is known as Link Fragmentation and Interleaving (LFI). An equivalent FRF.12 protocol is used for fragmentation and interleaving in Frame Relay networks.

Multilink bundles can carry a mix of digital data and real-time traffic, such as voice data. Voice data can be given priority by being assigned to a priority queue that gets priority over other data queues. A multilink load-scheduling algorithm distributes the voice packets in the priority queue among all the different links in the multilink bundle. This Quality of Service (QoS) queuing arrangement is known as Low Latency Queuing (LLQ), where the Priority Queue (PQ) is used for voice, and a Class Based Weighted Fair Queue (CBWFQ) is used for other data.

If the members of the MP bundles use an Asynchronous Transfer Mode (ATM) or Frame Relay (FR) protocol, the layer two ATM or FR network can provide priority to particular virtual circuits in the multilink bundle. This ensures that the traffic on selected virtual circuits receive higher priority than other virtual circuits.

The problem is that there is no way to ensure that high priority traffic on a virtual circuit receives higher priority treatment than data traffic on the same virtual circuit, in the layer-two network. For example, in periods of high network congestion, the layer-2 network will indiscriminately drop both high priority and non-high priority traffic from the non-priority virtual circuits in the multilink bundle. The priority traffic can be interleaved with the non-priority traffic in the multilink bundle. This can increase the latency for the priority traffic.

SUMMARY OF THE INVENTION

Selected categories of data are assigned to priority links in a multilink bundle. In one example, virtual circuits in an Asynchronous Transfer Mode (ATM) or Frame Relay (FR) network are assigned priority status and particular types of high priority data are only assigned to the priority virtual circuits.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a diagram showing two systems networked together using a Point-to-Point Multilink Protocol (MP).

DETAILED DESCRIPTION

Figure 2B:
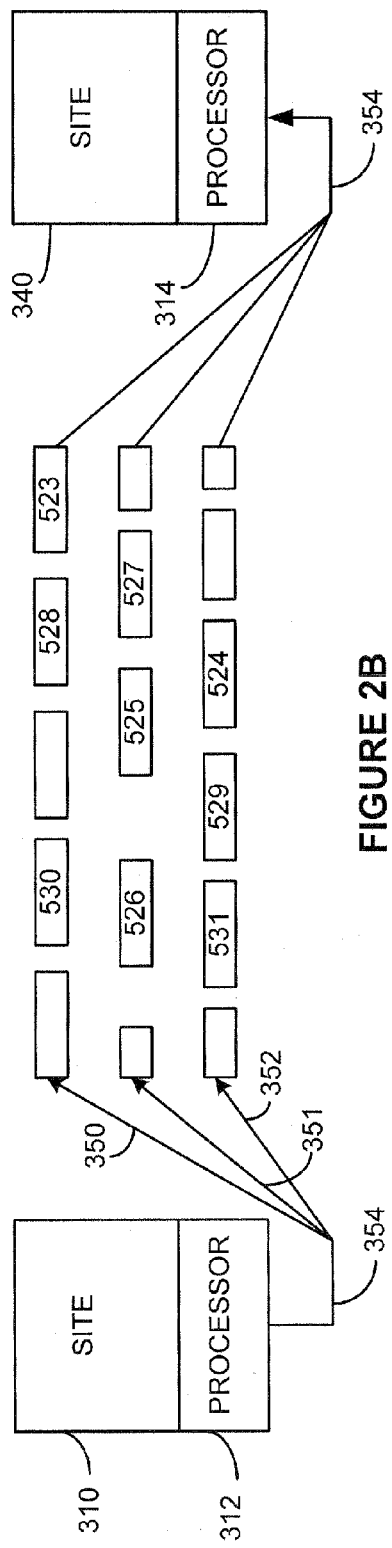
FIGS. 2A and 2B show how link fragmentation and interleaving are used for transporting data over the multilink bundle.

FIG. 1 shows two sites 310 and 340 connected to a packet switched network 300. The sites 310 and 340 represent any remote office, customer location, headquarters, etc. that contains a network processing device that can establish a multilink bundle over network 300. In one example, the network 300 is operated by an Internet Service Provider (ISP). Different computers 304 and phones 302 are connected to the network processing devices at sites 310 and 340.

One or more physical communication links couple the sites 310 and 340 to the network 300. In one example, the communication links are TI lines each containing multiple channels. At least one physical communication link includes multiple logical links 350, 351, and 352 of a multilink bundle 354. The links 350–352 are used for transferring data between site 310 and site 340.

Figure 2A:
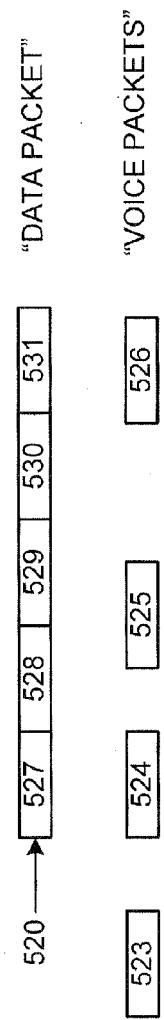

FIGS. 2A and 2B show how fragmentation and interleaving are performed in a multilink bundle. A data packet 520 contains digital data. The data packet 520 is divided into different packet fragments 527–531. Individual voice packets 523–526 each contain voice data.

A processor 312 at site 310 interleaves the packet fragments 527–531 of data packet 520 with the voice packets 523–526 on the different links 350–352. In one example, processor 312 uses a round robin scheme. For example, the first voice packet 523 is assigned to link 350, the first data packet fragment 527 is assigned to link 351, and the next voice packet 524 is assigned to link 352, etc. A Multiclass Multilink protocol (MCMP) may be used to assign sequence numbers to the interleaved voice packets.

In each link 350–351, voice packets may be interleaved with data packet fragments. The processor 314 at site 340 then reassembles the data packet fragments 527–531 according to assigned sequence numbers to form the original data packet 520. The processor 314 also regenerates a voice stream using the voice packets 523–526 associated with the same voice message.

If there is a congestion condition, packets arriving on a low-priority link may be indiscriminately dropped. For example, link 351 may be configured as a priority link while links 350 and 352 may be non-priority links. During a congestion condition, packets on links 350 and 352 may be dropped. This includes both fragments of data packet 520 and voice packets. This is undesirable since some classes of data, such as voice data, may need priority over other classes of data, such as the digital data 520. Congestion conditions on any of links 350–352 can also increase latency of the time sensitive voice packets.

Figure 3:
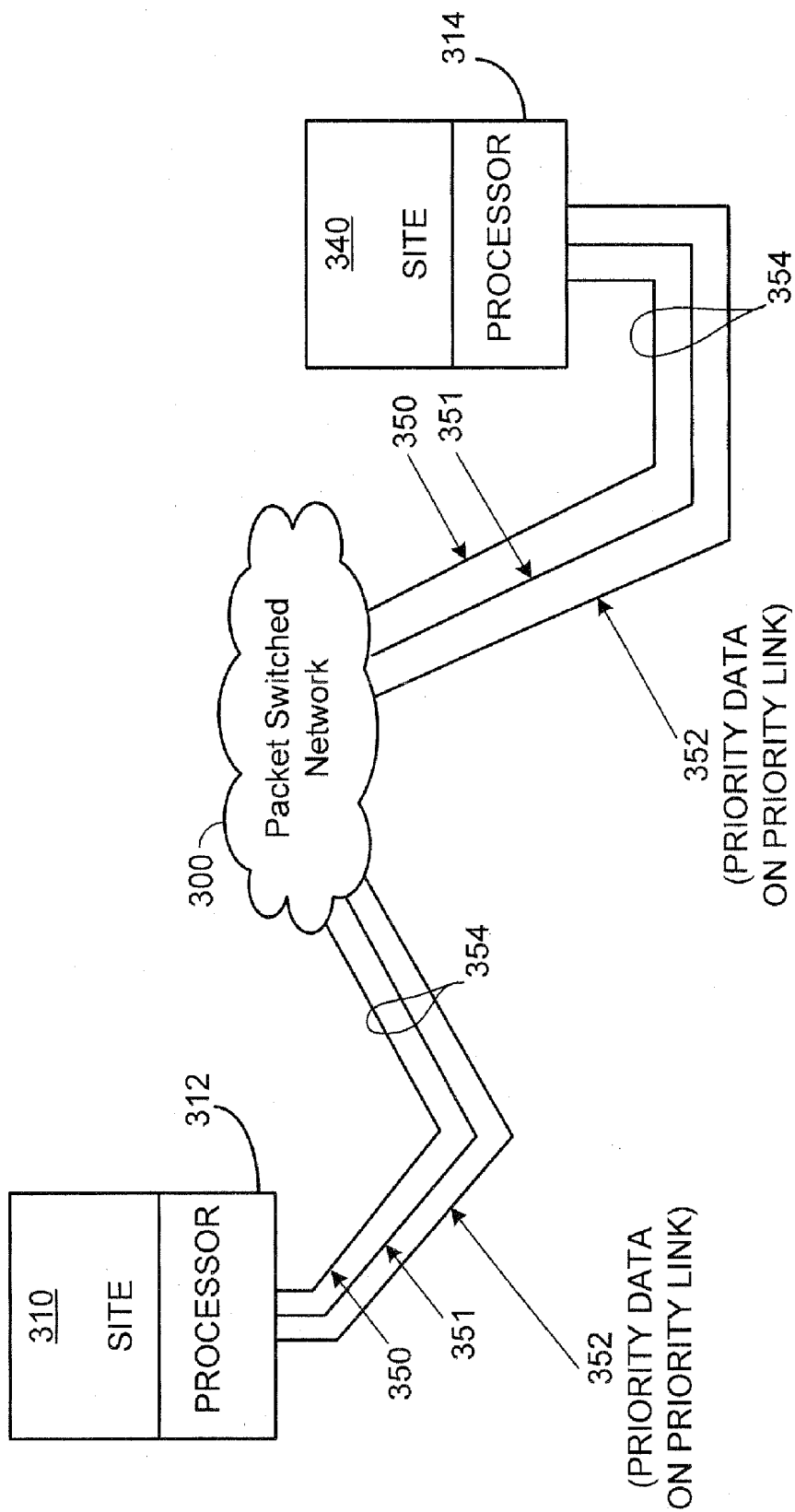
FIG. 3 is a diagram showing how a particular type of data is assigned priority in the multilink bundle.

Referring to FIG. 3, only selected types of data are placed on a previously assigned high priority link 352 within the multilink bundle 354. For example, processor 312 may send all voice data over the high priority link 352. This designation allows the network 300 between sites 310 and 340 to drop packets, if necessary, from low priority links 350 or 351 without dropping any voice packets. This also reduces the effects of delays on links 350 or 351 from adding latency to the voice packets on priority link 352.

In one example, the priority link 352 is preconfigured in the network processing devices operating in network 300 and at sites 310 and 340. The processors 312 and 314 then send only particular categories of data on the priority link 352. For example, the specific class or category of data may be voice or video data. In another embodiment, all data associated with a particular source or destination address may be assigned to the priority link 352. In another embodiment, all data associated with network signaling may be assigned to the priority link 352.

In one embodiment, the network 300 is a Layer-Two (L2) network, such as a Frame Relay (FR) or Asynchronous Transfer Mode (ATM) network. In this embodiment, the links 350–352 may be virtual circuits (VCs). However, any type of link can be used that can be combined with other links.

Figure 4B:
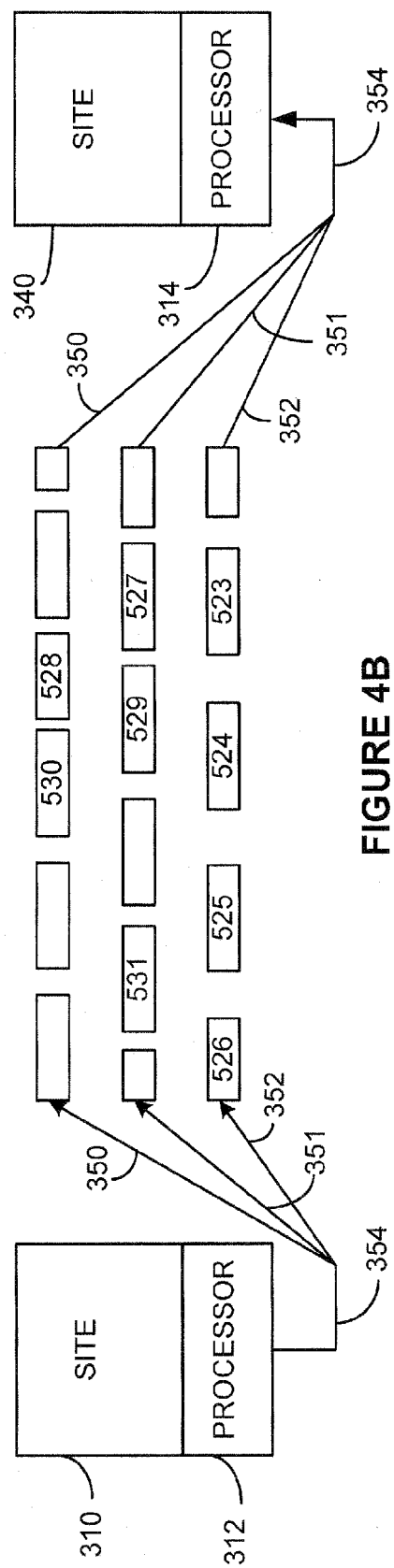
FIGS. 4A and 4B show how two messages are transmitted over priority and non-priority links in the multilink bundle.
Figure 4A:
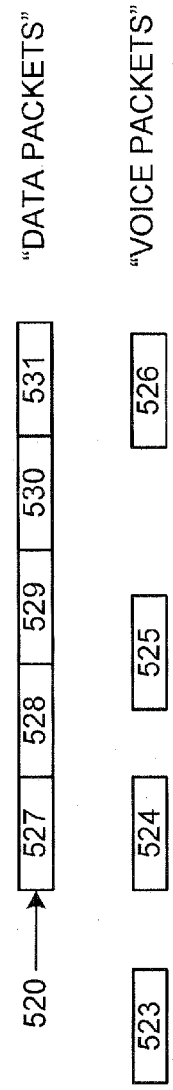

FIGS. 4A and 4B show how the processor 312 assigns data to the different links 350–352 in the multilink bundle 354. Link 352 has been preconfigured at sites 310 and 340 as the priority link and links 350 and 351 preconfigured as non-priority links.

Digital data packet 520 again comprises digital non-voice data that is divided into packet fragments 527–531. The voice packets 523–526 each contain voice data. Other messages may also be present on the multilink bundle 354 and are represented by unlabeled boxes in FIG. 4B.

Processor 312 transmits all voice packets 523–526 over priority link 352. The voice packets 523–526 represent one or more different voice calls. Packet fragments for digital packet 520 and other non-priority data is transmitted over non-priority links 350 and 351.

Any number of priority or non-priority links can exist in the multilink bundle 354. More than one type of data can also be transmitted over priority link 352. For example, voice data and data with a particular address can both be designated as priority data and sent over priority link 352. In another embodiment, when sufficient bandwidth exists, other non-priority data can be assigned to priority link 352.

If a congestion condition exists, packet fragments can be dropped from link 350 or link 351 without dropping any of the voice packets 523–526 on link 352. Thus, the voice packets are given priority processing in network devices associated with the multilink bundle 354.

Figure 5:
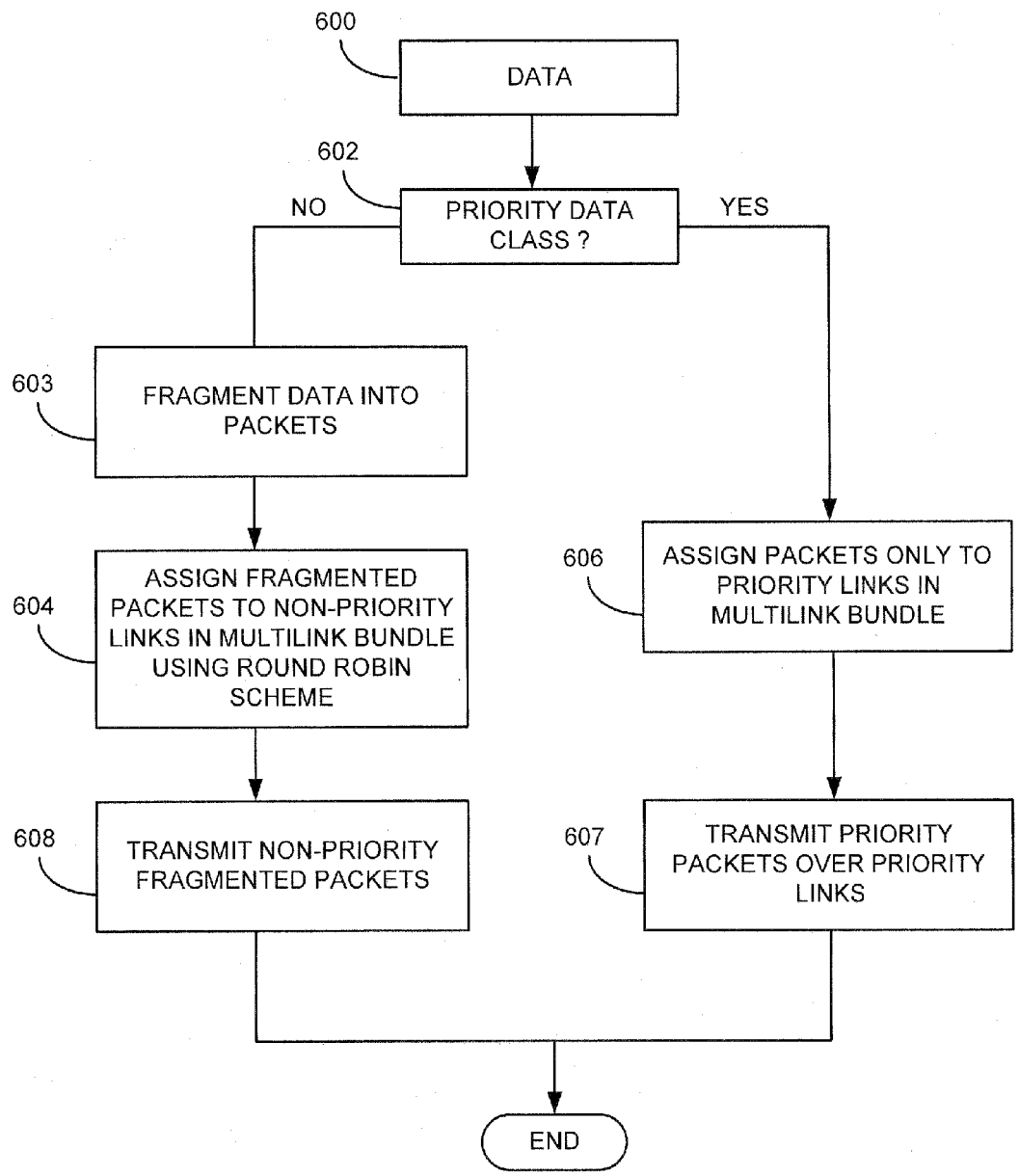
FIG. 5 is a flow diagram showing how different categories of data are assigned to different priority and non-priority links.

FIG. 5 describes in more detail how the processor 312 at site 310 or the processor 314 at site 340 (FIG. 3) transmits packets for the different priority and non-priority messages over the multilink bundle. In decision block 602, the processor checks information in received data 600 to determine if the data 600 belongs to a particular priority data class.

For example, the priority data class may be voice data. The processor could check a header, such as an Real Time Protocol (RTP) header, that identifies the packet as containing voice data. Alternatively, the processor may identify any data coming from a voice data compression process as priority data.

If the data 600 does not belong to the priority data class, the data may be fragmented into different packets in block 603. The non-priority packet fragments are then assigned to the different non-priority links in block 604. The non-priority fragmented packets are then transmitted over the IP network on their assigned links in block 608. In one example, a round-robin scheme or some other assignment scheme is used to distribute the packet fragments between the different non-priority links.

All data 600 belonging to the priority data class is assigned to the priority link in block 606. The priority packets are transmitted over the IP network on their assigned priority links in block 607.

Priority packets may be received by one of the processors while transmitting non-priority packets. After the current non-priority packet fragment is transmitted in block 608, the received priority packet is transmitted over the priority link in block 607. The processor then goes back to transmitting the non-priority packets over the non-priority links in block 608.

Figure 6:
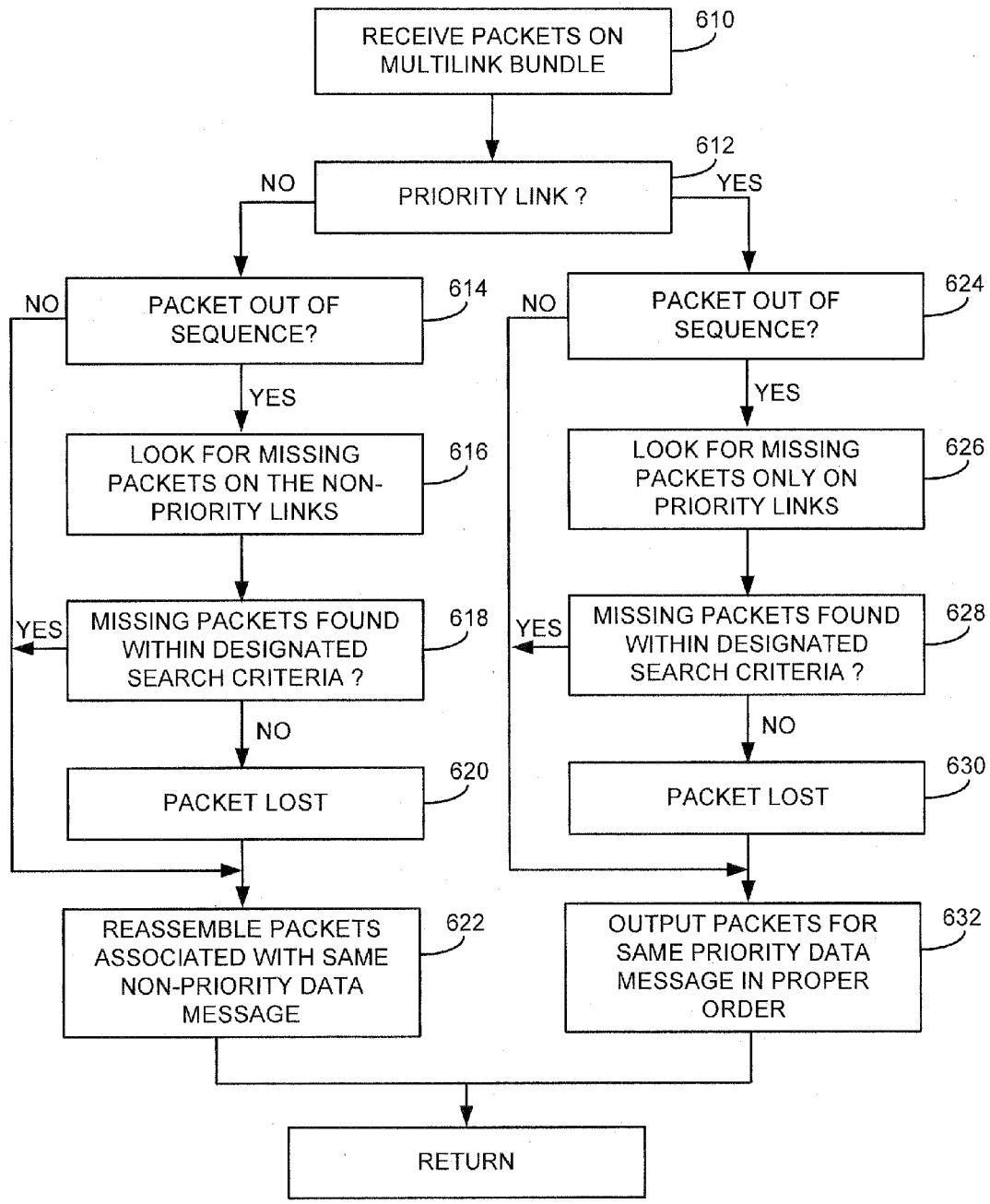
FIG. 6 is a flow diagram showing how packets from different priority and non-priority links are reassembled.

FIG. 6 shows some of the steps taken by a network processing device that receives packets over the multilink bundle. For example, this may be the processor 312 at site 310 or the processor 314 at site 340 (FIG. 3). Packets are received on the different links associated with the multilink bundle in block 610. The processor determines if the packet is received over a priority or non-priority link in block 612.

Packets received over a non-priority link are processed according to the operations in blocks 614–622. If packets are received out-of-sequence over the non-priority links in block 614, the processor looks for the missing packets on the non-priority links in block 616. Some selected search criteria is used in block 618 to determine if the missing packet is lost.

One search criteria determines a packet is lost when packet fragments past an expected sequence number are received on all of the non-priority links. In another search criteria, the processor looks for the missing packet on the non-priority links for some predetermined period of time. Other search criteria can also be used.

If the missing packet is not found using the search criteria used in block 618, the packet is determined to be lost in block 620. The processor may then drop all packet fragments for the message associated with the lost packet. If the missing packet is retrieved from one of the non-priority links, the processor reassembles the packet fragments into the non-priority data message in block 622.

Packets received over a priority link are processed according to the operations in blocks 624–632. If a packet for a message is received out of order in block 624, the processor 314 only searches for the missing packet on the priority link in block 626. In block 618 the processor uses the same or a different search criteria as that used in block 618 to determine whether or not the missing packet is actually lost. For example, the processor may search for the missing packet for some shorter period of time than that used for searching for non-priority packets in block 618.

All of the packets for a particular selected data class may be sent over the same priority link. Therefore, a situation may exist where no packets on the priority link are sent or should be received out of order. In this case, the search criteria in block 628 may simply consider any missing packet as lost.

If the missing priority packet is not found within the search criteria in block 628, the priority packet is identified as lost in block 630. If the missing packet is received within the selected search criteria, the missing packet may be combined with other packets associated with the same priority message in block 632.

Figure 7:
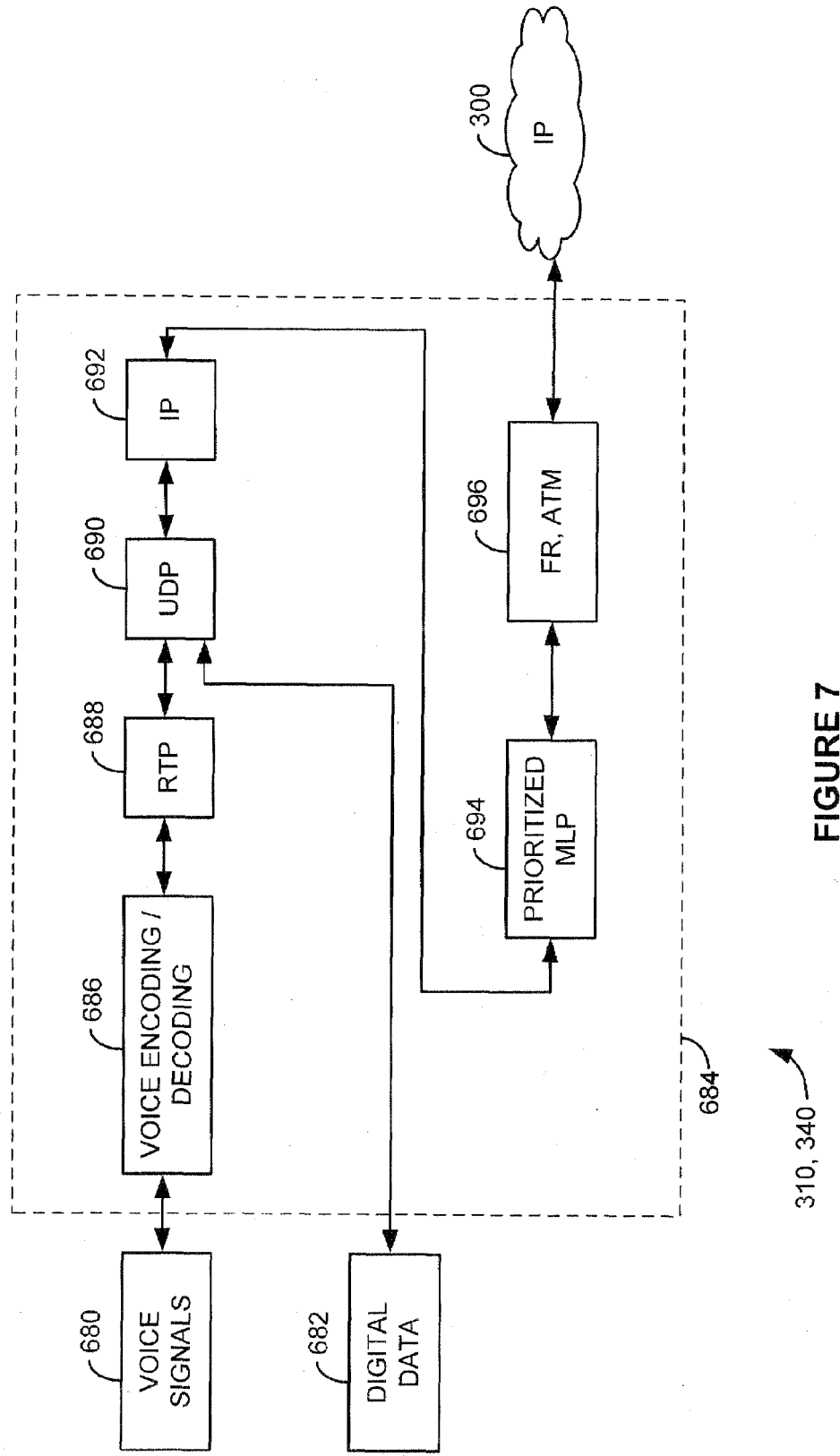
FIG. 7 is a diagram showing the functional operations performed by a network processing device.

FIG. 7 shows in more detail the different functions performed by a network processing device 684 located at either site 310 or 340. The network processing device includes one or more processors that are programmed to perform the operations described below.

In this example, voice data 680 and digital data 682 are both received by the network processing device 684. The voice data 680 is configured for transfer over the priority link. Of course, any category, class or selected data can be identified for transfer over the priority link. For example, any data associated with a particular address or port can be assigned to the priority link.

The voice signals 680 are encoded by a voice encoder/decoder 686. A Real Time Protocol (RTP) operation 688 attaches a RTP header to the encoded voice data. A User Datagram Protocol (UDP) and Internet Protocol (IP) operation in blocks 690 and 692 attach additional UDP and IP headers to the voice packets and data packets, respectively. A prioritized Multilink Protocol (MP) operation 694 assigns voice packets to one or more of the priority links. The prioritized MP 694 assigns non-priority links to the digital data 682.

In one example, a Frame Relay (FR) or Asynchronous Transfer Mode (ATM) operation 696 attaches FR or ATM headers, respectively, that identify virtual circuits associated with the priority and non-priority links. The FR or ATM headers are used by layer-2 switches in network 300 that can selectively drop packets during congestion conditions from one or more of the non-priority virtual circuits.

In one embodiment, the prioritized links are preconfigured in network 300 and at the user sites 310 and 340 (FIG. 3). For example, a system operator for sites 310 and 340 contacts the ISP for network 300 and requests a number of priority links. The ISP provider assigns a number of requested priority links. The system operator then configures the network processing devices at sites 310 and 340 with the identified priority link numbers.

In an alternative embodiment, smart signaling is used to send new priority link configurations on the fly to sites 310 and 340 and network 300. Signaling packets are sent from one of sites 310 or 340 that request a new priority link configuration. If the ISP accepts the priority request, the sites 310 and 340 automatically reconfigure local network processing devices for the new number of priority links identified by the ISP. The ISP also adjusts fee scheduling according to the number of new priority links.

Figure 8:
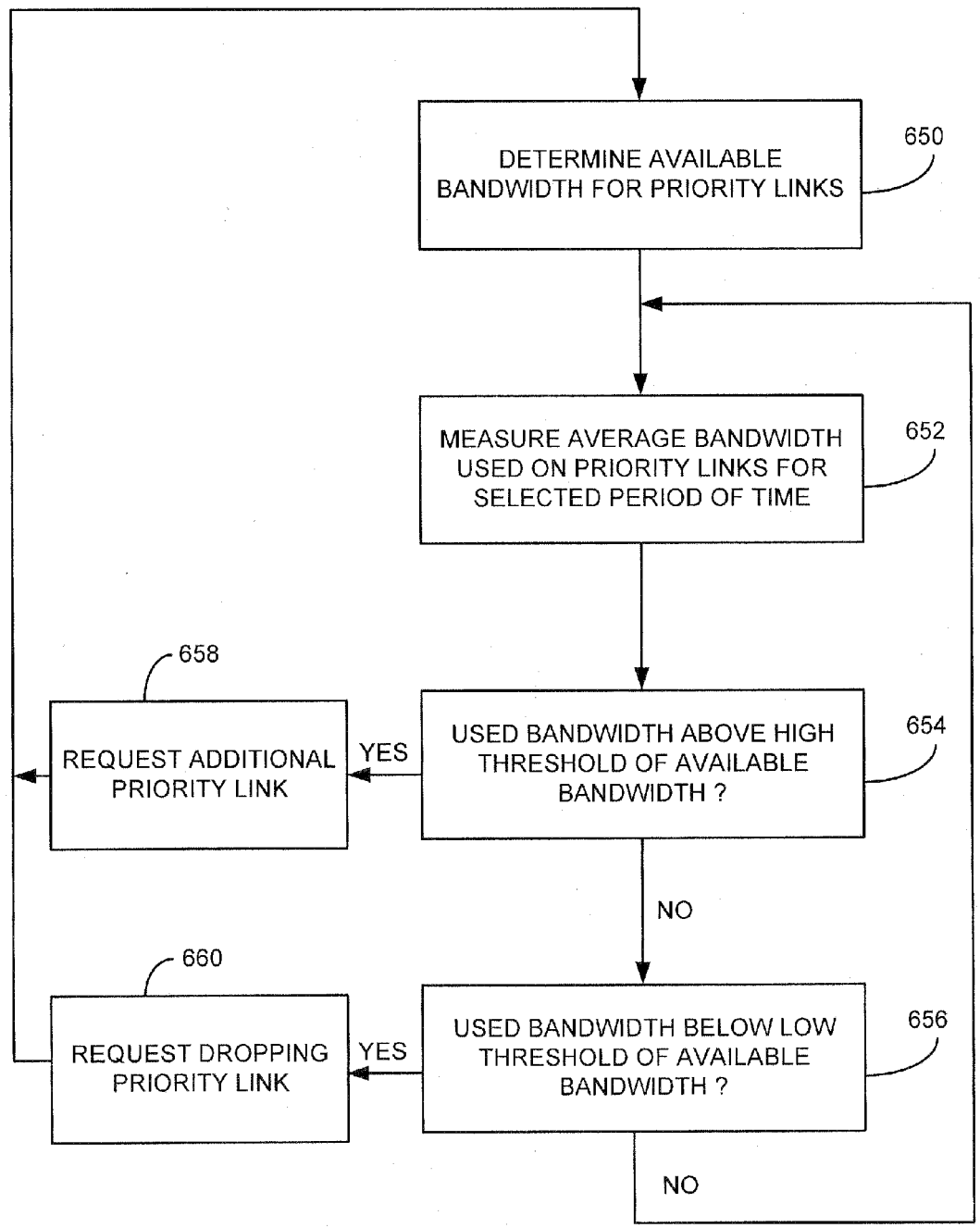
FIG. 8 is a flow diagram showing how priority links are automatically configured.

Referring to FIG. 8, the processor at one or both of sites 310 or 340 may determine an amount of available bandwidth for the priority links in block 650. The processor then measures the amount of data that is being transmitted over the priority links for some selected period of time in block 652. The amount of data being sent over the priority links may consistently exceed the available bandwidth, or some high bandwidth threshold in block 654. In this case, the processor automatically requests one or more additional priority links from the ISP in block 658.

In block 656, the amount of available bandwidth may be too much compared with the amount of bandwidth generally being used on the priority links. The processor in block 660 can automatically send out a request to the ISP and the other site to switch one or more priority links to non-priority link status.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method comprising:

assigning priority to one or more links in a multilink bundle, and identifying data belonging to a selected class and transmitting the identified data over the one or more priority links in the multilink bundle while transmitting data not belonging to the selected class over one or more non-priority links in the multilink bundle;

searching the identified data transmitted over the one or more priority links for a first missing packet and determining the first missing packet to be lost if the first missing packet is not found within a first duration of time; and searching the data transmitted over the one or more non-priority links for a second missing packet and determining the second missing packet to be lost if the second missing packet is not found within a second duration of time;

where the first duration of time is shorter than the second duration of time.

2. The method according to claim 1 including:

identifying a congestion condition; and dropping data only from one or more of the non-priority links during the congestion condition.

3. The method of claim 1 including fragmenting messages for nonselected categories into packet fragments and distributing the packet fragments over the non-priority links while sending packets associated with the selected class only over the priority links.

4. The method of claim 1 including transferring the messages on the priority and non-priority links from a first site to a second site over a Frame Relay network or an Asynchronous Transfer Mode (ATM) network.

5. The method of claim 1 including assigning priority and non-priority virtual circuits in a layer-2 network and transferring the selected class of data only over the priority virtual circuits.

6. The method of claim 1 including identifying the selected class according to a type or class of data or according to an address associated with the data.

7. The method of claim 1 including assigning priority to the links by pre-configuring network processing devices at different customer sites and at an Internet Service Provider network.

8. The method of claim 1 including assigning priority to the links by sending signaling messages from a customer site to a network processing device in an Internet Service Provider network.

9. The method according to claim 8 including:
determining an amount of available bandwidth on the priority links;
determining an amount of bandwidth used on the priority links over some period of time; and
automatically assigning an additional priority link when the used bandwidth is above some threshold associated with the available bandwidth.

10. A method for processing data over a packet network comprising:
receiving packets over links in a multilink bundle, a selected number of the links associated with a selected data category, and
giving priority to the packets associated with the selected data category by giving the selected links in the multilink bundle higher processing priority than non-selected links in the multilink bundle;
searching the packets associated with the selected data category for a first missing packet and determining the first missing packet to be lost if the first missing packet is not found within a first duration of time; and
searching packets received over the non-selected links for a second missing packet and determining the second missing packet to be lost if the second missing packet is not found within a second duration of time,
where the first duration of time is shorter than the second duration of time.

11. A method according to claim 10 including giving higher priority to the selected links by dropping packets from the non-selected links during congestion conditions.

12. The method according to claim 10 including only monitoring the different non-selected links for packet fragments associated with a non-selected data category.

13. The method according to clam 12 including receiving packets over the selected links associated with a message and only monitoring the selected links for other packets associated with the same message.

14. The method according to claim 10 including using a Layer 2 network to transfer the packets in the multilink bundle between a first site and a second site.

15. The method according to claim 10 including using a Frame Relay or Asynchronous Transfer Mode protocol for establishing the selected links and the non-selected links.

16. The method according to claim 10 including pre-configuring endpoints and a Layer-2 switch to identify the selected links and non-selected links.

17. The method according to claim 10 including receiving signaling requesting additional selected links and automatically establishing additional selected links according to the signaling.

18. A computer readable medium containing code for transferring data over a network, the computer readable medium comprising:
code for assigning priority to one or more links in a multilink bundle, and
code for identifying data belonging to a selected class and transmitting the identified data over the one or more priority links in the multilink bundle while transmitting data not belonging to the selected class over one or more non-priority links in the multilink bundle;
code for searching the identified data belonging to the selected class for a first missing packet and determining the first missing packet to be lost if the first missing packet is not found within a first duration of time, and
searching the data not belonging to the selected class for a second missing packet and determining the second missing packet to be lost if the second missing packet is not found within a second duration of time:
where the first duration of time is shorter than the second duration of time.

19. A computer readable medium according to claim 18 including:
code for identifying a congestion condition; and
code for dropping data only from one or more of the non-priority links during the congestion condition.

20. A computer readable medium according to claim 18 including code for fragmenting messages for nonselected categories into packet fragments and distributing the packet fragments over the non-priority links while sending packets associated with the selected class only over the priority links.

21. A computer readable medium according to claim 18 including code for transferring the messages on the priority and non-priority links from a first site to a second site over a Frame Relay network.

22. A computer readable medium according to claim 18 including code for assigning priority to the links by sending signaling messages from a customer site to a network processing device in an Internet Service Provider network.

23. A computer readable medium according to claim 22 including:
code for determining an amount of available bandwidth on the priority links;
code for determining an amount of bandwidth used on the priority links over some period of time; and
code for automatically assigning an additional priority link when the used bandwidth is above some threshold associated with the available bandwidth.

24. A system for transferring data over a network, comprising:
means for assigning priority to one or more links in a multilink bundle, and
means for identifying data belonging to a selected class and assigning the identified data to the one or more priority links in the multilink bundle while assigning data not belonging to the selected class to one or more non-priority links in the multilink bundle;
means for searching the identified data belonging to the selected class for a first missing packet and determining the first missing packet to be lost if the first missing packet is not found within a first duration of time; and
means for searching data not belonging to the selected class for a second missing packet and determining the second missing packet to be lost if the second missing packet is not found within a second duration of time;
where the first duration of time is shorter than the second duration of time.

25. A system according to claim 24 including:
    means for identifying a congestion condition; and
    means for dropping data only from one or more of the non-priority links during the congestion condition.

26. A system according to claim 24 including means for fragmenting messages for nonselected categories into packet fragments and distributing the packet fragments over the non-priority links while sending packets associated with the selected class only over the priority links.

27. A system according to claim 24 including means for transferring the messages on the priority and non-priority links from a first site to a second site over a Frame Relay network.

28. A system according to claim 24 including means for assigning priority to the links by sending signaling messages from a customer site to a network processing device in an Internet Service Provider network.

29. A system according to claim 28 including:
    means for determining an amount of available bandwidth on the priority links;
    means for determining an amount of bandwidth used on the priority links over some period of time; and
    means for automatically assigning an additional priority link when the used bandwidth is above some threshold associated with the available bandwidth.

* * * * *